United States Patent [19]

Dotson

[11] 4,052,757

[45] Oct. 11, 1977

[54] HYDROTHERAPY INSTALLATION

[76] Inventor: Troy R. Dotson, 3702 E. Winchcomb, Phoenix, Ariz. 85032

[21] Appl. No.: 653,460

[22] Filed: Jan. 29, 1976

[51] Int. Cl.² .......................... E04H 3/16; E04H 3/18; F16L 22/02

[52] U.S. Cl. .................................... 4/172.17; 4/172.16

[58] Field of Search .................. 4/172, 172.11, 172.16, 4/172.18, 172.17; 126/270, 271

[56] References Cited

U.S. PATENT DOCUMENTS

| | | | |
|---|---|---|---|
| 3,521,304 | 7/1970 | Ghiz | 4/172.16 |
| 3,605,131 | 9/1971 | Brazel et al. | 4/172.16 |
| 3,623,165 | 11/1971 | Whittell, Jr. | 4/172.15 |
| 3,749,244 | 7/1973 | Jannuzzi, Jr. | 4/172 |
| 3,781,925 | 1/1974 | Curtis et al. | 4/172.15 |
| 3,915,450 | 10/1975 | Flewwelling et al. | 4/172.16 |
| 3,943,580 | 3/1976 | Carter | 4/172.15 |
| 3,945,059 | 3/1976 | Allocco, Jr. | 4/172 |
| 3,970,069 | 7/1976 | Pickett | 126/271 |

*Primary Examiner*—Henry K. Artis
*Attorney, Agent, or Firm*—Warren F. B. Lindsley

[57] ABSTRACT

A novel blower assembly for coaxial mounting with a conventinal swimming pool filter pump and a common drive motor, the blower being a required element of a hydrotherapy installation incorporated as a feature of the pool.

5 Claims, 3 Drawing Figures

HYDROTHERAPY INSTALLATION

BACKGROUND OF THE INVENTION

The population shift of recent years toward the hot and arid regions of the southwest has produced a growing interest in swimming pools and a rapid expansion of the swimming pool industry.

In this part of the country where it is too hot during a greater part of the year for most active sports, the family or neighborhood swimming pool offers a welcome relief from the oppressive summer heat as well as a means for the practice of one of the best known forms of health and body building exercise. Moreover, in this land of retirement communities, swimming and related forms of hydrotherapy are becoming increasingly popular as an effective form of treatment for arthritus and other ailments common among the aged.

Along with the increased popularity of swimming pools there has been an attendant growth in the associated technologies with a growing list of equipment being added to the typical installation for the enhancement of the operating features and for the reduction of maintenance care. Such added equipment includes automatic cleaning and chlorinating appliances, aerators, heaters and, more recently, the pumps and special fixtures associated with hydrotherapy.

In order that the benefits offered by the swimming pool may be realized and enjoyed by a greater percentage of the population, there is a need to reduce the complexity of this equipment while retaining the worthwhile features it provides. More specifically there is a need to reduce the total number of separate motors and other appliances presently employed to provide the desired features.

SUMMARY OF THE INVENTION

In accordance with the invention claimed a novel blower assembly is provided which permits the coaxial assembly of a blower along with a conventional filter pump and a common drive motor, the blower being a required element for hydrotherapy installations which ordinarily utilizes its own separate drive motor.

It is therefore one object of this invention to provide a novel blower assembly for application in a hydrotherapy pool installation.

Another object of this invention is to provide a blower assembly which may be readily mounted coaxially with a conventional filter pump and a common drive motor.

A further object of this invention is to provide such a blower assembly in a form which permits such coaxial mounting through the use of standard fixtures already employed in the swimming pool industry.

A still further object of this invention is to provide as an added feature of the blower a means for the introduction of solar energy along with the blower air supply.

A still further object of this invention is to provide as an attendant benefit of the novel blower assembly, a reduction in the capital and operating costs of the typical swimming pool and hydrotherapy installation.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which.

DESCRIPTION OF THE PREFERRED EMBODIMENT

Figure 1:
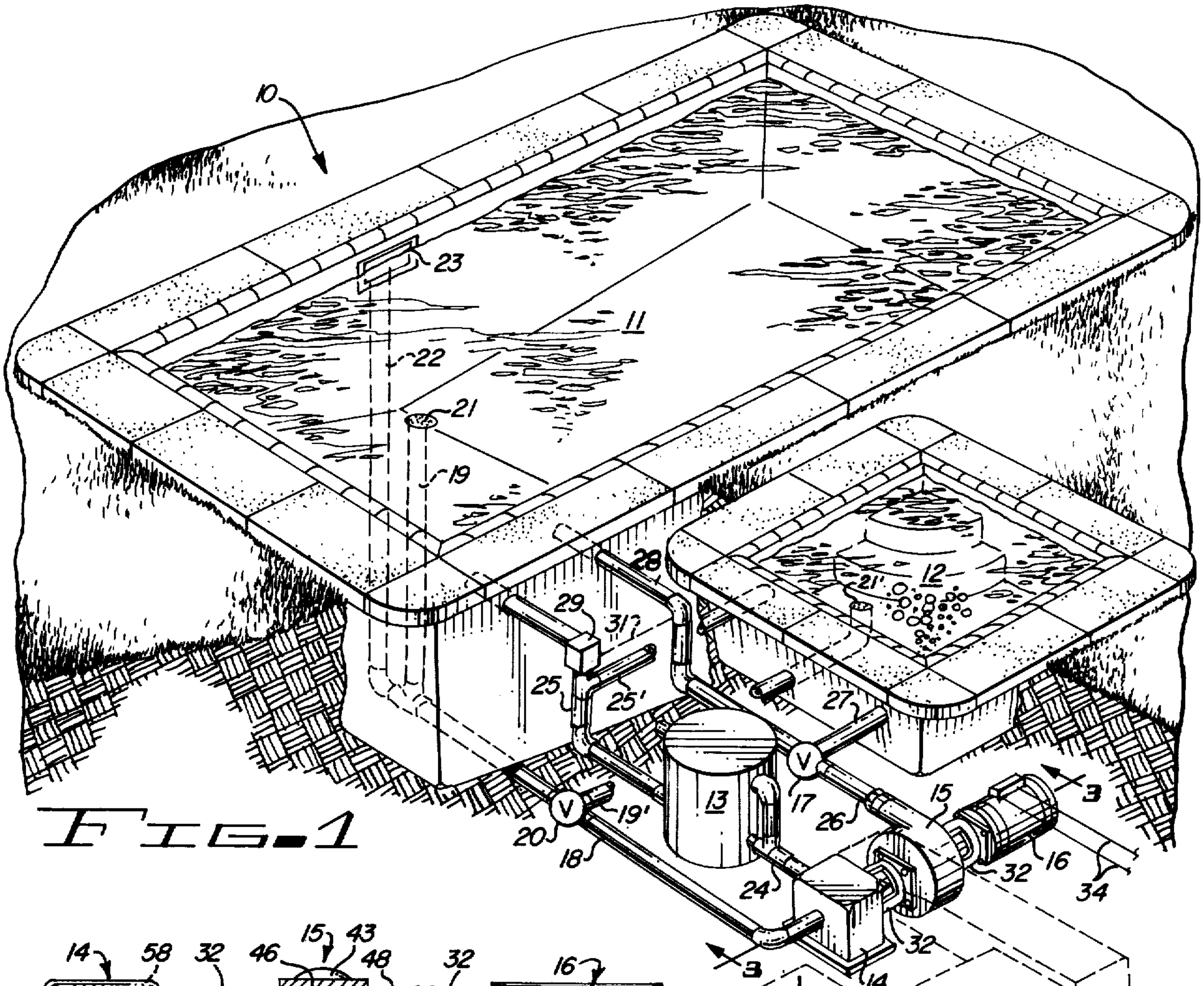
FIG. 1 is a perspective view of a swimming pool and hydrotherapy pool installation incorporating the blower and mounting fixtures of the invention.

Referring more particularly to the drawing by characters of reference, FIG. 1 discloses a swimming pool and hydrotherapy installation 10 comprising a main swimming pool 11, a hydrotherapy pool 12, a pool filter 13, a filter pump 14, the hydrotherapy blower 15 of the invention, a common drive motor 16 and a two-way valve 17.

The filter pump 14 draws water from either pool 11 or pool 12 through main water line 18 which has a first branch 19 connected to the main pool drain 21 and a second branch 19' connected to the hydrotherapy drain 21'. A third branch 22 is connected to the skimmer 23 of pool 11. Water leaves the pump through a line 24 leading into filter 13, and the filtered water flows through pool return lines 25, 25' to pools 11 and 12, respectively entering in pools 11, 12 in one or a number of water return ports (not shown) which may be distributed around the periphery of the pool. Two-way valve 20 may be placed at the junction of lines 19, 19' to isolate the water systems of pools 11 and 12, if so desired.

The hydrotherapy blower 15 has an air inlet at the side adjacent pump 14 and its air exhaust flows through an air line 26 to two-way valve 17. From valve 17 the air flows either through a line 27 to the hydrotherapy pool 12 or through a line 28 to the main swimming pool 11 depending upon the set position of valve 17. Line 27 leads to one or a number of air jets appropriately distributed around the periphery of pool 12 and line 28 leads to one or a number of air jets distributed to selected locations in pool 11.

When a main pool 11 is equipped in this manner with hydrotherapy jets a nook or corner shelf or bench is generally selected for location of the jets. This allows a swimmer to rest in the area while utilizing the jets to relieve cramped or tired muscles or simply for relaxation.

While the installation 10, as just described, was indicated as employing a set of air jets which were completely separate from the water return ports, in another practical and less expensive arrangement, the air jets delivering air to pool 11 may be eliminated by connecting line 28 from valve 17 to a mixer valve 29 as indicated by broken line 31.

Mixer valve 29, which is connected in series with water return line 25, introduces the air from line 28 into the water flowing in line 25 by releasing it through an internal venturi nozzle (not shown) well known in the art.

As indicated in FIG. 1, pump 14 and blower 15 are coaxially mounted to drive motor 16 by means of two mounting fixtures 32, the first fixture 32 securing pump 14 to blower 15 and the second securing blower 15 to drive motor 16. Electrical connection to motor 16 is made through a single pair of electrical conductors 34.

Because heat is beneficial in conjunction with hydrotheraphy, the water in pool 12 is generally heated to a relatively high temperature and while it is not practical or desirable to heat the water in main pool 11 to the same high temperature as for pool 12, it is helpful in either case if the air from blower 15 is heated by some suitable means.

The design of blower 15 anticipates an appropriate means for supplying heated air, as indicated in FIG. 1, by the broken line representations of a solar collector 35 connected by a hot air duct 36 to a cowling or plenum 37 surrounding the air intake side of blower 15. In this arrangement the flow of air 38 into collector 35 is heated by solar energy 39 and the heated air passes through duct 36 and cowling 37 into the air inlet opening of blower 15 and thence to valve 17 to be directed either to pool 12 or to pool 11. The heated air is thus utilized either to heat the water in pool 12 or to provide heat directly at the point of use at the air jets in pool 11 or pool 12.

The utilization of solar energy for this purpose is preferred, or course, because it conserves energy in other forms. In specific embodiments of this variation further advantages may be realized. For example, in a typical home installation the solar collector 35 may simply comprise the attic area of the house which ordinarily contains an ample supply of air that has been heated by the sun. As this heated attic air is drawn off to supply the hydrotherapy jets a further advantage is realized by a reduction of air temperature in the attic which, in turn, reduces cooling costs for the home.

Figure 3:
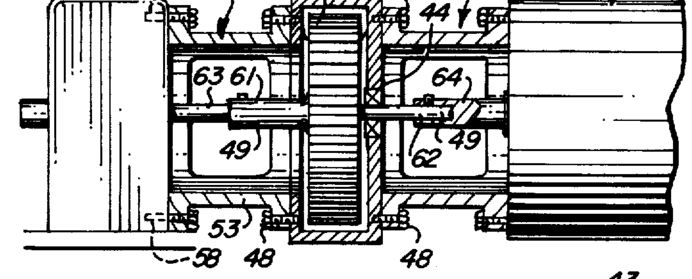
FIG. 3 is a side view of the pump, blower and drive motor coaxially mounted by means of the mounting fixtures with portions of the blower and fixtures cut away to reveal details of construction.
Figure 2:
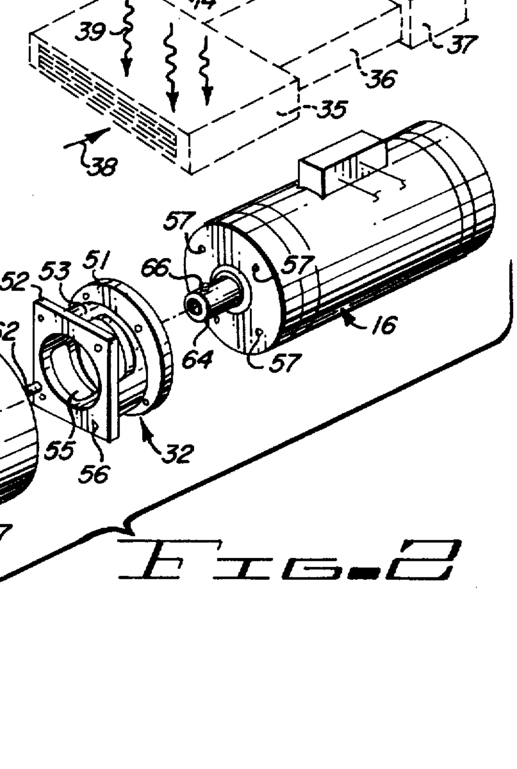
FIG. 2 is an exploded perspective view of the blower and the mounting fixtures shown in coaxial mounting relationship with the pool filter pump and the common drive motor.

Specific details of the construction of blower 15 and of the mounting fixtures 32 which permit the economics claimed for this invention are shown more clearly in FIGS. 2 and 3.

The blower 15 is a short-axis squirrel cage type. Its housing 42 is in the form of a short cylinder with an integral exhaust port 43 that tapers off tangentially from an outer cylindrical surface. The cylindrical housing 42 is closed on one end except for a small centered circular opening 44 which holds the single rotor bearing, the rotor being supported at one end only. A larger circular opening 45 is provided at the other end of housing 42 which serves as the air inlet. A conventional squirrel cage rotor 46 is employed. Four symmetrically located tapped holes 47 are provided on each of the two end faces of the housing 42 to receive mounting screws 48 which are employed to secure the fixtures 32 to blower 15. The blower shaft 49 extends through openings 44 and 45 at both ends of housing 42.

The two mounting fixtures 32 are similar each having two parallel open discs or plates 51 and 52 held in position opposite each other by three or more struts 53. Struts 53 are perpendicularly connected between plates 51 and 52 and are symmetrically arranged around circular center openings 54 and 55 provided, respectively, in plates 51 and 52. It should be recognized that while the outer periphery of plate 51 is shown circular and the outer periphery of plate 52 is shown square, the shape of the outer periphery is not critical in either case and may be circular, square, hexagonal or any shape which proves most producible. Four clearance holes 56 in each plate 51 and 52 are positioned for alignment with holes 47 of blower housing 42 and for alignment with correspondingly located tapped holes 57 in the end plates of motor 16. Similarly positioned and aligned tapped holes 58 are provided in the end plate of pump 14.

By virtue of the common hole patterns for holes 47 and 57 and for those in the end plate of pump 14, a standard fixture 32 may be employed for mounting pump 14 to blower 15 and blower 15 to motor 16 as shown in FIGS. 1-3. If desired, one or more additional blowers 15 may be introduced along with the necessary additional fixtures 32 so that any desired number of blowers may be driven by the same motor 16 provided the rating of motor 16 is not exceeded.

Pump 14 is already available in the market place in a version which employs a mounting fixture similar to fixture 32 which is an integral part of the pump housing and the hole patterns corresponding to holes 58 are the same as those for fixtures 32 of this invention. The design of blower 15 may also incorporate fixture 32 as an integral part of housing 42.

The foregoing description explains the physical mountings and support of pump 14, blower 15 and motor 16 in co-linear relationship. To complete the interconnection, provision is made for the direct connection of their drive shafts. To facilitate such connection the axle of blower 15 is designed with a female coupling 61 extending from the left hand end and with a simple shaft 62 extending from the right hand end. Female coupling 61 has an axial bore corresponding in diameter to shaft 63 of pump 14 and shaft 62 has an outer diameter corresponding to the inside diameter of the female coupling 64 of motor 16. Thus, as pump 14, blower 15 and motor 16 are clamped together as shown in the drawing by means of fixtures 32, shaft 63 slides into the center bore of coupling 61 and shaft 62 slides into the center bore of coupling 64. The coupling is completed by setting lock nuts 65 and 66. If desired a more universally adaptable arrangement may be utilized wherein blower 15 is supplied with a simple shaft at both ends. A sleeve coupling may be employed for making connection to the shafts of other devices such as pumps and motors.

A novel and practical blower design is thus provided which is appropriate for the intended application and which permits it to be mounted conveniently to a common drive motor along with a standard pool filter pump in accordance with the stated objects of the invention. Because the additional load represented by blower 15 is small relative to the loading of pump 14 it will, in general, be possible to use the same motor rating as is required for the pump alone. The pressurized air supply for the hydrotherapy jets is thus made available by the addition of a blower only. No additional motor or electrical connections are required. Furthermore, the addition of the blower in this inexpensive manner is shown to have provided an inexpensive mean also for the introduction of solar heat energy into the pool or hydrotherapy installation.

Although but a single embodiment of the present invention has been illustrated and described, it will be apparent to those skilled in the art that various changes and modifications may be made therein without departing from the spirit of the invention or from the scope of the appended claims.

What is claimed is:

1. A hydrotherapy installation for pools comprising in combination:

a rotary driven shaft, a pump assembly connected to said shaft for actuation thereof for pumping water to and from a pool, a blower assembly connected to said shaft for actuation thereof, means for transmitting air under pressure from said blower assembly to a pool, an electric motor for rotating said shaft, a cowling mounted around at least a part of said blower assembly for directing air into said blower assembly, and means for preheating the air received by said cowling.

2. The hydrotherapy installation set forth in claim 1 wherein:

said pump assembly and said blower assembly are coaxially aligned on said shaft.

3. The hydrotherapy installation set forth in claim 1 wherein:

said means for preheating the air received by said cowling comprises a solar heating means.

4. The hydrotherapy installation set forth in claim 1 in further combination with:

means for mixing the heated air from said blower assembly with water being pumped to a pool for heating the water.

5. The hydrotherapy installation set forth in claim 3 wherein:

said solar heating means is a solar energy absorbing means, and said blower assembly draws air from the atmosphere and around at least a part of said solar energy absorbing means.

* * * * *